United States Patent
Sela et al.

(10) Patent No.: US 9,760,299 B2
(45) Date of Patent: Sep. 12, 2017

(54) METHOD AND SYSTEM FOR HIJACKING WRITES TO A NON-VOLATILE MEMORY

(71) Applicant: SanDisk Technologies, Inc., Plano, TX (US)

(72) Inventors: Rotem Sela, Haifa (IL); Moshe Raz, Kefar Rosh Hanikra (IL); Paul Yaroshenko, Haifa (IL)

(73) Assignee: SanDisk Technologies LLC, Plano, TX (US)

( * ) Notice: Subject to any disclaimer, the term of this patent is extended or adjusted under 35 U.S.C. 154(b) by 263 days.

(21) Appl. No.: 14/629,167

(22) Filed: Feb. 23, 2015

(65) Prior Publication Data

US 2015/0199145 A1 Jul. 16, 2015

Related U.S. Application Data

(62) Division of application No. 12/965,503, filed on Dec. 10, 2010, now Pat. No. 8,966,201.

(51) Int. Cl.
*G06F 12/00* (2006.01)
*G06F 3/06* (2006.01)

(52) U.S. Cl.
CPC .......... *G06F 3/0623* (2013.01); *G06F 3/0607* (2013.01); *G06F 3/0659* (2013.01); *G06F 3/0679* (2013.01); *G06F 3/0688* (2013.01)

(58) Field of Classification Search
USPC ....................................................... 711/103
See application file for complete search history.

(56) References Cited

U.S. PATENT DOCUMENTS

| | | | |
|---|---|---|---|
| 6,694,381 B1 | 2/2004 | Lo et al. | |
| 7,334,077 B2 | 2/2008 | Nassar | |
| 8,819,328 B2 * | 8/2014 | Lassa | G06F 9/4843 711/103 |
| 8,886,956 B2 * | 11/2014 | Lee | G06F 21/80 713/189 |
| 8,966,201 B2 | 2/2015 | Sela et al. | |
| 2005/0086421 A1 | 4/2005 | Nassar | |
| 2005/0195635 A1 | 9/2005 | Conley et al. | |
| 2006/0288166 A1 | 12/2006 | Smith, Jr. et al. | |
| 2007/0136501 A1 | 6/2007 | Chang et al. | |
| 2009/0070691 A1 | 3/2009 | Jain | |

OTHER PUBLICATIONS

International Search Report and Written Opinion from corresponding PCT Appln. No. PCT/US2011/059971 dated Mar. 7, 2012 (9 pages).

* cited by examiner

*Primary Examiner* — Matthew Bradley
(74) *Attorney, Agent, or Firm* — Brinks Gilson & Lione

(57) ABSTRACT

A method and system for accessing enhanced functionality on a storage device is disclosed. A hijack command is sent to the storage device that includes an identifier (such as a signature or an address). The storage device determines whether to hijack one or more subsequently commands by analyzing the subsequently commands using the identifier. For example, the storage device may analyze the subsequently received commands to determine whether the signature is in the payload of the subsequently received commands. As another example, the storage device may compare the address in the subsequently received commands with the address in the hijack command to determine whether to hijack the subsequently received commands.

28 Claims, 15 Drawing Sheets

FIG. 13

| Byte Offset | Arg Length | Argument Name | Argument Type | Comments |
|---|---|---|---|---|
| 0-35 | 36 | Reserved for card transport layer | Undefined | |
| 36-75 | 40 | Common argument section | | |
| 76 | 4 | Stream ID | Integer | Specifies the Stream ID returned by the Open Stream command. The Stream ID parameter is available for the session through which this command was sent. |
| 80 | 1 | Number of Signatures | Integer | Number of signatures to replace with Original Data as provided in the next blocks. This value could be from 0 to a Maximum Number. In case this value is 0 the memory system works without signatures. |
| 81 | 10 | Base Signature Value | String | This string serves as the base signature for Enhanced Trusted Flash (TF) write command. The strings would be replaced with the Original Data as discussed with respect to FIG. 12.

One example of the structure of the complete Signature (in the data block) is:

Base Signature Value ‖ Stream ID ‖ Index ‖ NHS

Index is a one byte extension to the 'Base Signature Value'. This value is a sequential number starting from '1'.

Number of Hijacked Sectors (NHS) is a one byte extension to the 'Base Signature Value'. This value represents the number of sectors to be hijacked through the TF stream. |
| 108-511 | 420 | Reserved | Reserved Area | |

FIG. 14

| Byte Offset | Arg Length | Argument Name | Argument Type | Comments |
|---|---|---|---|---|
| 0 | 16 | Original Data 1 | String | Optional field this data would replace the next sector which starts with "Base Signature Value" \|\| 1 \|\| size" |
| 16 | 16 | Original Data 2 | String | Optional field this data would replace the next sector which starts with "Base Signature Value" \|\| 2 \|\| size" |
|  | 16 | * * * | String | * * * |
| 240 | 16 | Original Data 16 | String | Optional field this data would replace the next sector which starts with "Base Signature Value" \|\| 32 \|\| size" |

METHOD AND SYSTEM FOR HIJACKING WRITES TO A NON-VOLATILE MEMORY

REFERENCE TO RELATED APPLICATION

This application is a divisional of U.S. application Ser. No. 12/965,503 (now U.S. Pat. No. 8,966,201), which is hereby incorporated by reference herein in its entirety.

TECHNICAL FIELD

This application relates generally to managing data in a memory system. More specifically, this application relates to the operation of a memory system that enables a host application to send data for manipulation (such as encryption) prior to storage in the memory system.

BACKGROUND

Non-volatile memory systems, such as flash memory, have been widely adopted for use in host devices, such as consumer products. Flash memory may be found in different forms, such as in the form of a portable memory card that can be carried between host devices or as a solid state disk (SSD) embedded in a host device.

An example of a memory system 102 in combination with a host system 100 is shown in FIG. 1. Host system 100 includes one or more host applications 110 and a host operating system 108. The host operating system 108 includes device drivers 114. The memory system 102 includes a system controller 118 and a memory 116. The memory system 102 may be in the form of a card that is removably connected to the host system 100 through mating parts 104 and 106 of a mechanical and electrical connector as illustrated in FIG. 1.

The host applications 110 execute on top of the host operating system 108, including making system calls using an applications programming interface (API) 112 to the host operating system. More specifically, the API 112 is an interface implemented by the host applications 110 (or other software program) that enables the host applications 110 to interact with other software, such as the memory system 102.

In system calls involving accessing the memory system 102, the host operating system 108 has a set of commands it can perform with respect to the memory system 102, and uses the device drivers 114 to configure a command from the set of commands. In particular, the device drivers 114 format the command for the particular type of memory system 102 (e.g., flash memory, RAM, static RAM, etc.) and the particular action (such as read, write, etc.).

For example, the host operating system 108 sends a command to read memory locations at particular Logical Block Addresses (LBAs). The logical block is a virtual unit of address space defined to have the same size as a physical block. A logical block is typically 512 Bytes of host data identified by a logical block address (LBA) within a logical partition. Each logical block includes a range of logical block addresses (LBAs) that are associated with data received from the host device. The LBAs are then mapped to one or more physical blocks in the flash memory where the data is physically stored. The system controller 118 may convert between the LBAs in the command and physical addresses of the memory 116.

Adding new functionality to the host operating system may include expanding the set of commands in the host operating system. For example, adding data encryption to the set of commands in the host operating system may include an upgrade, such as by modifying existing device drivers or adding new drivers. There are times, however, when it is not feasible or possible to upgrade the host operating system.

As discussed above, the host operating system has access to the LBAs, which are used to formulate the commands to the memory card 102. However, other parts of the host device, such as the host applications 110, are usually not exposed to the LBAs. In order to implement the new functionality using the host application, previous solutions provided the LBAs to the host application.

One solution is for the host application to copy the host file system from the storage device, and using the copied host file system, provide the LBA of the file. However, this solution causes multiple copies of the file system, with the traditional host file system being managed by the host operating system and the duplicate host file system being managed by the host application. A second solution is for the host application to query the host operating system for the LBA of the file. However this solution may not be available since the host operating system may not support queries for the LBA.

Accordingly, both solutions to provide the LBA to the host application using the file system suffer from drawbacks.

BRIEF SUMMARY

Embodiments of the present invention are defined by the claims, and nothing in this section should be taken as a limitation on those claims. In order to address the need for accessing enhanced functions on the memory system, methods and systems are disclosed herein for enabling access to enhanced functions in the memory system without modifying the host operating system. According to one embodiment, a method for hijacking commands is performed by a storage device that is operatively coupled to a host. The method includes the storage device receiving a command and one or more subsequent commands from the host. The command is indicative of an operation (such as encryption) to be performed by the storage device, and includes an identifier. The one or more subsequent commands are indicative of another operation (such as a write to the memory of the storage device). The storage device then analyzes the one or more subsequent commands using the identifier to determine whether to perform the operation. The former command may be a "hijack" command with a hijack operation. The method analyzes subsequently received commands using the identifier from the hijack command to determine whether to hijack a subsequently received command. The hijacking of the subsequently received command may include performing the hijack operation in place of the operation indicated in a subsequently received command, or it may include performing the hijack operation in addition to the operation indicated in the subsequently received command. In this way, the storage device may determine whether to hijack a subsequently received command by analyzing the hijack command and performing the hijack operation in place of the operation indicated in the subsequently received command using the identifier sent in the hijack command.

In one aspect, the identifier in the command is a data sequence (such as a signature), and the analysis performed by the storage device involves determining whether the one or more subsequent commands include the data sequence (such as determining whether there is a signature in the payload of a write command indicating a Trusted Flash hijack command). In another aspect, the identifier in the command is a command address (such as an LBA), and the analysis performed by the storage device is comparing one or more subsequent addresses in the one or more subsequent commands with the command address (such as determining whether the one or more subsequent addresses are in a range as defined by the command address or determining whether the one or more subsequent addresses equals the command address).

The hijack command may be in one of several forms. One form is for the hijack command to be the same type of command as the one or more subsequent commands, such as hijack command and the one or more subsequent commands being storage commands. For example, both the hijack command and the subsequent commands may be write commands. In addition to being identified as a write command, the hijack command may include one or more predetermined sequences (such as a signature) to identify the write command as a hijack command. The hijack command may further include an operation identifier (such as a streamID) that identifies the operation of the hijack command (such as an encryption operation). Another form is for the hijack command to be a different type of command from the one or more subsequent commands. For example, the hijack command may be a controller command, with an opcode or other field indicating the operation of the hijack command (such as an encryption operation).

If it is determined to hijack the subsequent command, the hijack operation is performed on at least a part of the data in the subsequent command. In addition to data in the subsequent command, data subject to manipulation by the hijack operation may be included in the hijack command. After the data is manipulated, the manipulated data (including the manipulated data from the command and the manipulated data from a subsequent command) may be stored in a memory of the storage device using an address included in the subsequent command.

According to another embodiment, a storage device that includes a memory, an interface, and a controller is provided. The interface is configured to receive a command and one or more subsequent commands, the command indicative of an operation to be performed by the storage device and including an identifier, each of the one or more subsequent commands indicative of another operation to be performed by the storage device and including data. The controller is configured to analyze the one or more subsequent commands using the identifier to determine whether to perform the operation on the data in the one or more subsequent commands. In response to determining to perform the operation, the controller performs the operation on at least a part of the data in the one or more subsequent commands. In one aspect, the identifier in the command is a data sequence (such as a signature), and the analysis performed by the storage device is determining whether the one or more subsequent commands include the data sequence. In another aspect, the identifier in the command is a command address (such as an LBA), and the analysis performed by the storage device is comparing one or more subsequent addresses in the one or more subsequent commands with the command.

According to still another embodiment, a method managing a storage device that operatively coupled to a host is provided. The method includes the storage device receiving a controller command from the host via a controller interface. The controller command may be an Advanced Security SD (ASSD) command, and the controller interface includes one or more APIs for communicating with the controller on the storage device. The storage device analyzes at least a part of the controller command for information indicative of an operation (such as an encryption operation). The storage device then receives a storage command from the host via a storage interface of the storage device. The storage command relates to storage actions for the memory of the storage device (such as a read or write command to the memory), and the storage interface includes one or more application program interfaces (APIs) for performing storage actions with a memory on the storage device. The storage device determines whether the storage command includes a predetermined sequence (such as a signature). If so, the storage device modifies at least a part of data in the storage command with the operation that was indicated in the controller command.

According to another embodiment, a storage device that includes a memory, a controller interface, a storage interface, and a controller is provided. The controller interface is configured to process one or more controller commands, and may include one or more APIs for processing the controller commands. The storage interface is configured to process one or more storage commands, and may include one or more APIs for processing the storage commands. The controller is configured to: analyze at least a part of the one or more controller commands for information indicative of an operation; determine whether the one or more storage commands include a predetermined data sequence; and in response to determining that the one or more storage commands include the predetermined data sequence, modify at least a part of data in the one or more storage commands with the operation.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

FIG. 13 is a table listing the write command arguments in the hijack command.

FIG. 14 is a table listing the organization of the data blocks in the hijack command.

DETAILED DESCRIPTION

Figure 1:
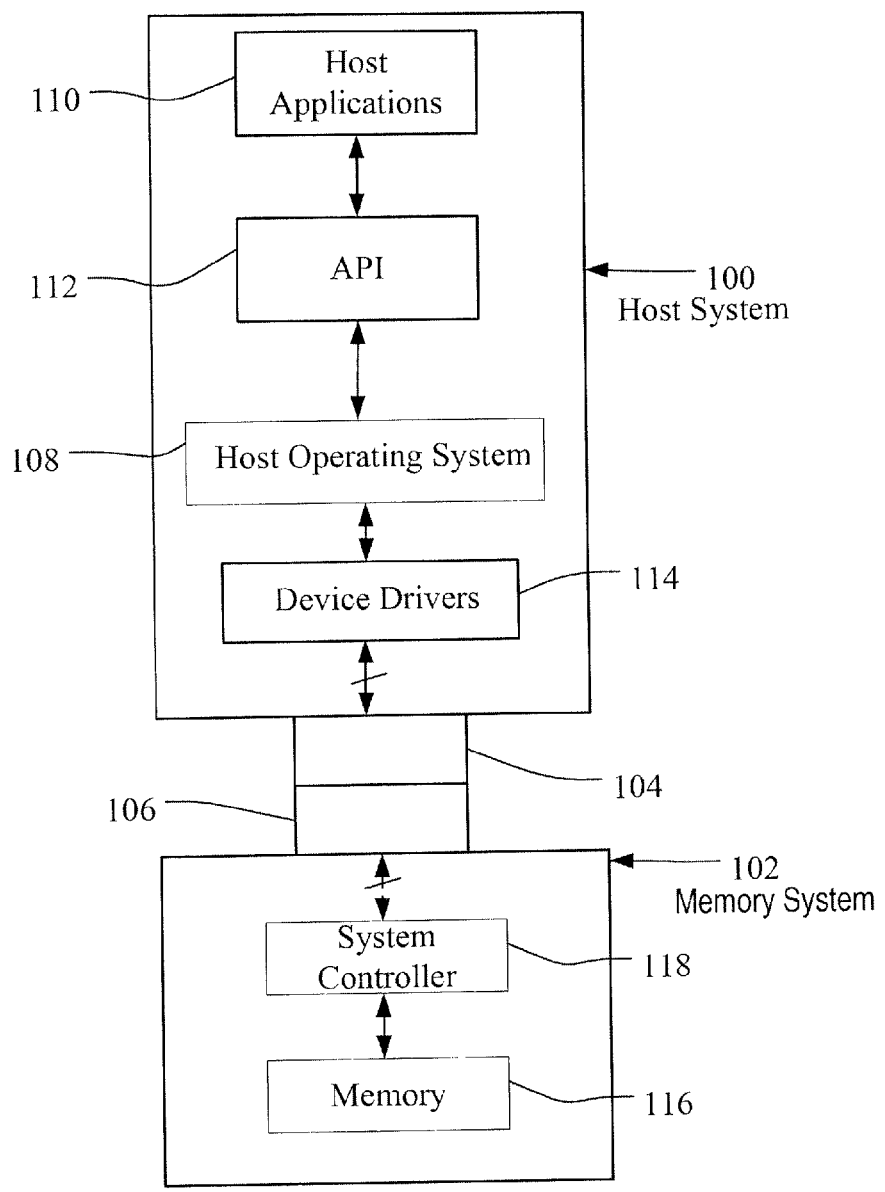
FIG. 1 illustrates a conventional host connected with a memory system.
Figure 2:
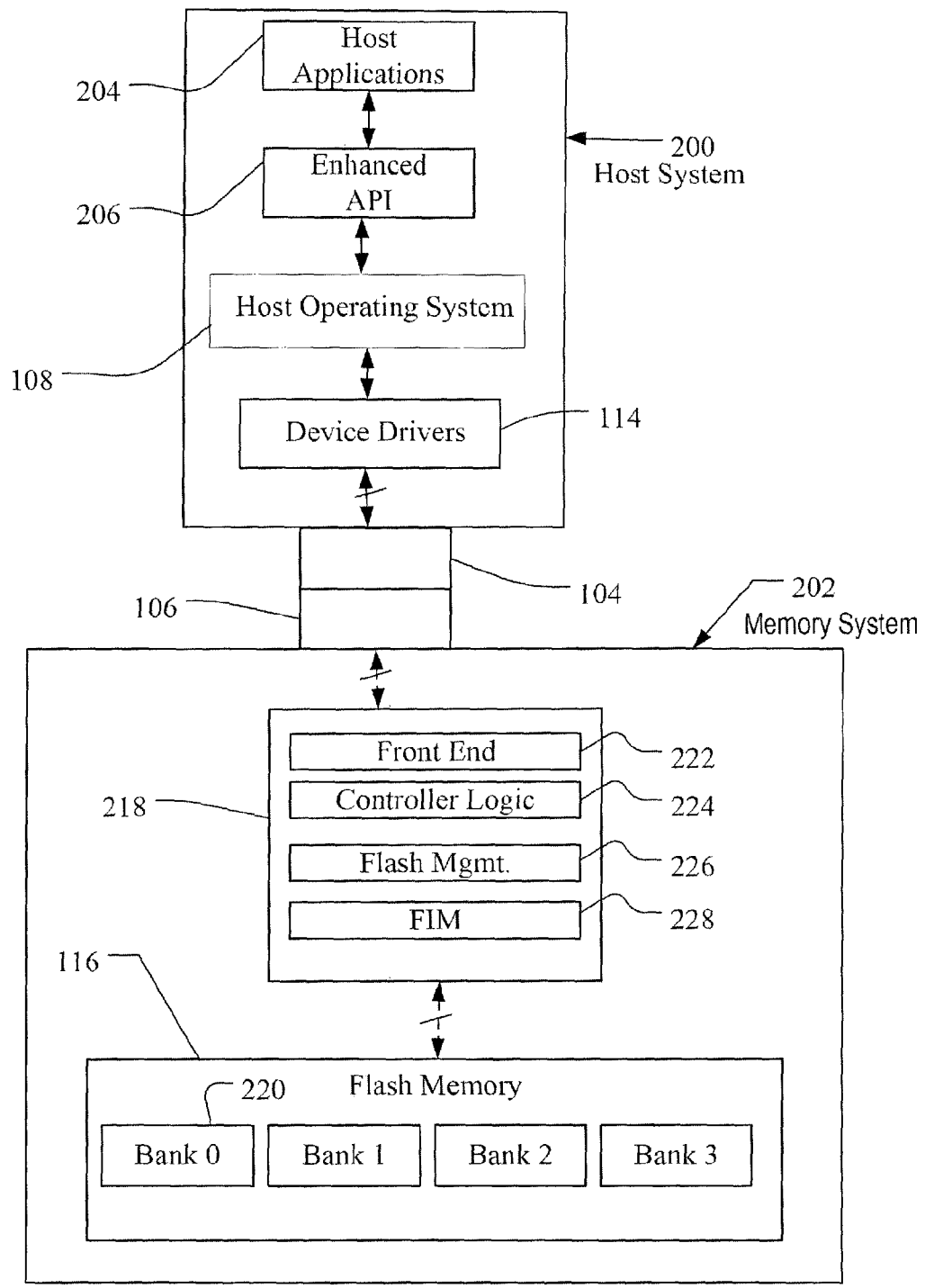
FIG. 2 illustrates a host connected with a memory system having multi-bank non-volatile memory.

A flash memory system suitable for use in implementing aspects of the invention is shown in FIGS. 2-7. A host system 200 of FIG. 2 stores data into and retrieves data from a memory system 202. The memory system 202 may be flash memory embedded within the host, such as in the form of a solid state disk (SSD) drive installed in a personal computer. Alternatively, the memory system 202 may be in the form of a card that is removably connected to the host through mating parts 104 and 106 of a mechanical and electrical connector as illustrated in FIG. 2. A flash memory configured for use as an internal or embedded SSD drive may look similar to the schematic of FIG. 2, with the primary difference being the location of the memory system 202 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include the CompactFlash (CF), the MultiMediaCard (MMC), Secure Digital (SD), miniSD, Memory Stick, and TransFlash cards. Although each of these cards has a unique mechanical and/or electrical interface according to its standardized specifications, the flash memory system included in each is similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The memory system usually contains its own memory controller and drivers but there are also some memory-only systems that are instead controlled by software executed by the host to which the memory is connected. In some memory systems containing the controller, especially those embedded within a host, the memory, controller and drivers are often formed on a single integrated circuit chip.

The host system 200 of FIG. 2 may be viewed as having two major parts, insofar as the memory system 202 is concerned, made up of a combination of circuitry and software. They are an applications portion (which includes host applications 204 and enhanced API 206) and the host operating system 108 (which includes device drivers 114). As discussed in more detail below, the applications portion enables accessing enhanced functionality of the memory system 202 that the host operating system 108 is unable to access. FIG. 2 depicts enhanced API 206 as the portion enabling the host application to access the enhanced functionality of the memory system 202. Alternatively, the software to access the enhanced functionality of the memory system 202 may reside in the host applications 204, or in a combination of the host applications 204 and the enhanced API 206.

The host system 200 may include a processor (such as a microprocessor, central processing unit (CPU), microcontroller, or the like) and a memory (such as volatile and non-volatile memory) (not shown) in order to implement the applications portion and the host operating system, such as running the one or more host applications 204 and the host operating system 108. The host applications 204 may include, for example, word processing, graphics, control or other popular application software. The host operating system 108 may comprise software for managing data on the host system 200. In a camera, cellular telephone or other host system that is primarily dedicated to performing a single set of functions, the host application 204 may comprise software that operates the camera to take and store pictures, the cellular telephone to make and receive calls, and the like.

The memory system 202 of FIG. 2 may include non-volatile memory, such as a multi-bank flash memory 116, and a system controller 218. The system controller interfaces with the host system 200 to which the memory system 202 is connected for passing data back and forth, and controls the memory 116. The system controller 218 may convert between logical addresses of data used by the host 200 and physical addresses of the multi-bank flash memory 116 during data programming and reading. The multi-bank flash memory 116 may include any number of memory banks 120 and four memory banks are shown in FIG. 2 simply by way of illustration. Functionally, the system controller 218 may include a front end 222 that interfaces with the host system 200, controller logic 224 for coordinating operation of the memory 116, flash management logic 226 for internal memory management operations such as system initiation, writing data within a block, bad block management and handling block linkage information, as well as one or more flash interface modules (FIMs) 228 to provide a communication interface between the system controller 218 with the flash memory 216. As discussed in more detail below, the controller logic 224 includes enhanced functionality (such as encryption) and processes communications to and from the host system 200 related to the enhanced functionality (such as commands generated by the enhanced API 206).

Figure 3:
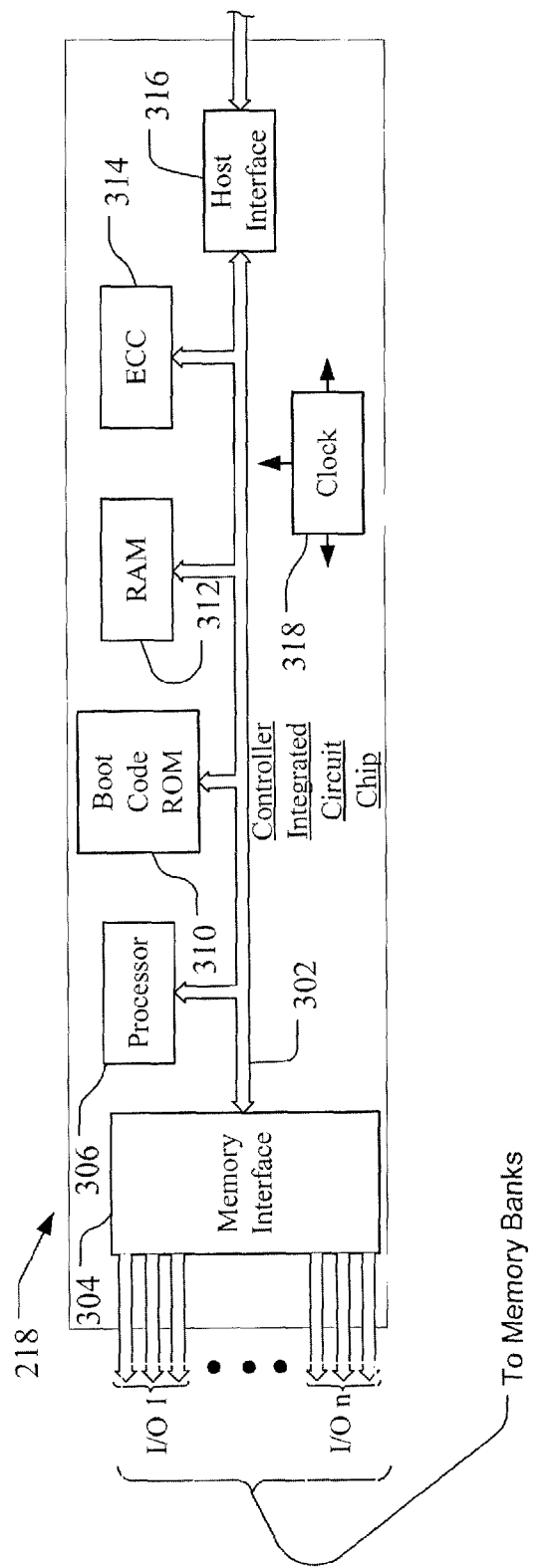
FIG. 3 is an example block diagram of an example flash memory system controller for use in the multi-bank non-volatile memory of FIG. 2.

The system controller 218 may be implemented on a single integrated circuit chip, such as an application specific integrated circuit (ASIC) as shown in FIG. 3. The processor 306 of the system controller 218 may be configured as a multi-thread processor capable of communicating separately with each of the respective memory banks 220 via a memory interface 304 having I/O ports for each of the respective banks 220 in the multi-bank flash memory 116. The system controller 218 may include an internal clock 318. The processor 306 communicates with an error correction code (ECC) module 314, a RAM buffer 312, a host interface 316, and boot code ROM 310 via an internal data bus 302.

Figure 4:
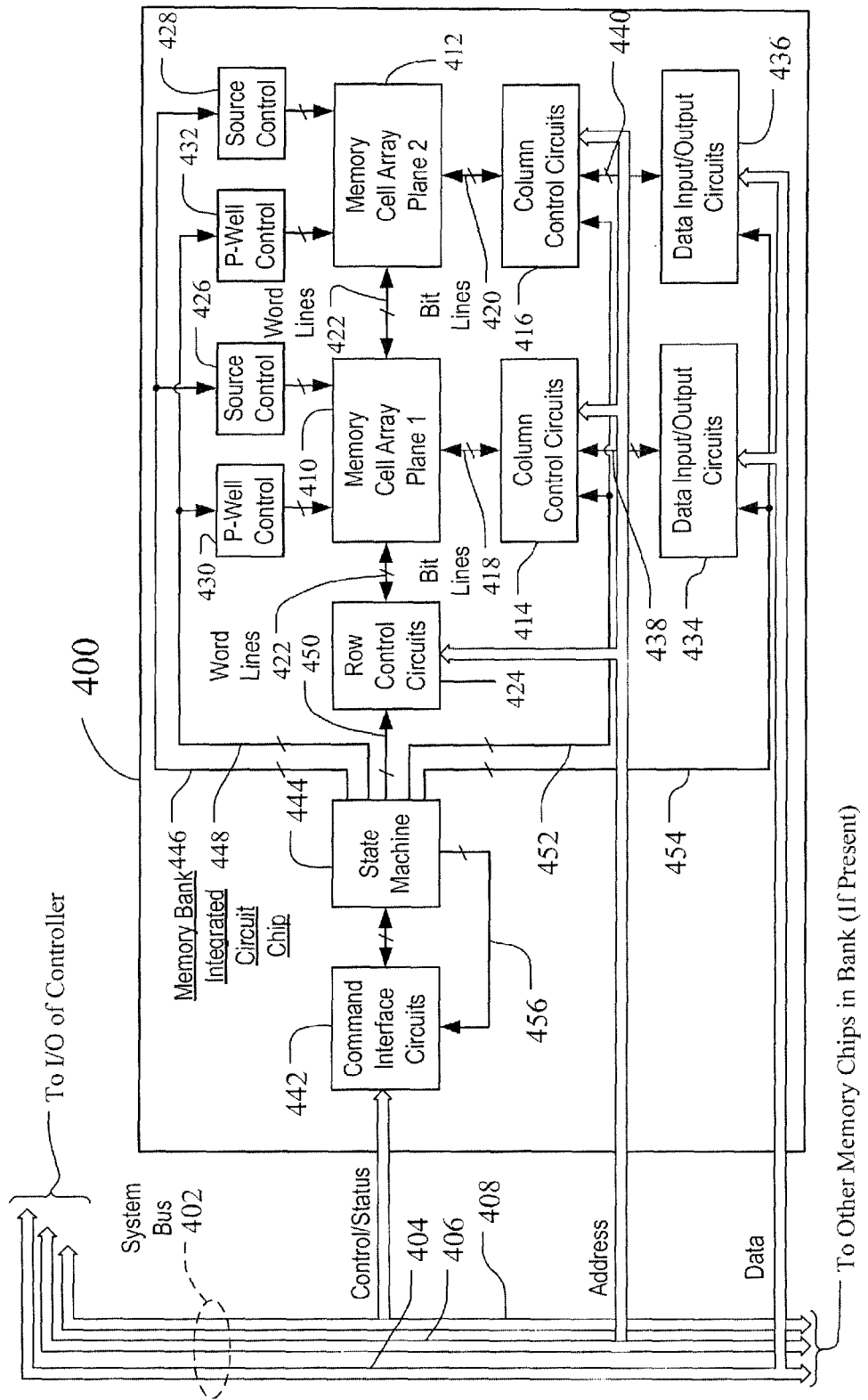
FIG. 4 is an example one flash memory bank suitable as one of the flash memory banks illustrated in FIG. 2.

Each bank 220 in the multi-bank flash memory 116 may comprise one or more integrated circuit chips, where each chip may contain an array of memory cells organized into multiple planes. An illustration of a memory bank 400 on a single chip is shown in FIG. 4. The memory bank 400 of FIG. 4 shows such planes 410 and 412 for simplicity but a greater number of planes, such as four or eight planes, may instead be used. Alternatively, the memory cell array of a memory bank may not be divided into planes. When so divided, however, each plane has its own column control circuits 414 and 416 that are operable independently of each other. The circuits 414 and 416 receive addresses of their respective memory cell array from the address portion 406 of the system bus 402, and decode them to address a specific one or more of respective bit lines 418 and 420. The word lines 422 are addressed through row control circuits 424 in response to addresses received on the address bus. Source voltage control circuits 426 and 428 are also connected with the respective planes, as are p-well voltage control circuits 430 and 432. If the bank 400 is in the form of a memory chip with a single array of memory cells, and if two or more such chips exist in the system, the array of each chip may be operated similarly to a plane within the multi-plane chip described above.

Data are transferred into and out of the planes 410 and 412 through respective data input/output circuits 434 and 436 that are connected with the data portion 404 of the system bus 402. The circuits 434 and 436 provide for both programming data into the memory cells and for reading data from the memory cells of their respective planes, through lines 438 and 440 connected to the planes through respective column control circuits 414 and 416.

Each memory chip in each bank 220 contains some controlling circuitry that executes commands from the controller 218 to perform such functions. Interface circuits 442 are connected to the control and status portion 408 of the system bus 402. Commands from the controller 218 are provided to a state machine 444 that then provides specific control of other circuits in order to execute these commands. Control lines 446-454 connect the state machine 444 with these other circuits as shown in FIG. 4. Status information from the state machine 444 is communicated over lines 456 to the interface 442 for transmission to the controller 218 over the bus portion 408.

A NAND architecture of the memory cell arrays 410 and 412 is discussed below, although other non-volatile memory architectures or technologies, alone or combination, such as NOR, can be used instead. An example NAND array is illustrated by the circuit diagram of FIG. 5, which is a portion of the memory cell array 410 of the memory bank 400 of FIG. 4. A large number of global bit lines are provided, only four such lines 502-508 being shown in FIG. 5 for simplicity of explanation. A number of series connected memory cell strings 510-524 are connected between one of these bit lines and a reference potential. Using the memory cell string 514 as representative, a plurality of charge storage memory cells 526-532 are connected in series with select transistors 534 and 536 at either end of the string. When the select transistors of a string are rendered conductive, the string is connected between its bit line and the reference potential. One memory cell within that string is then programmed or read at a time.

Figure 5:
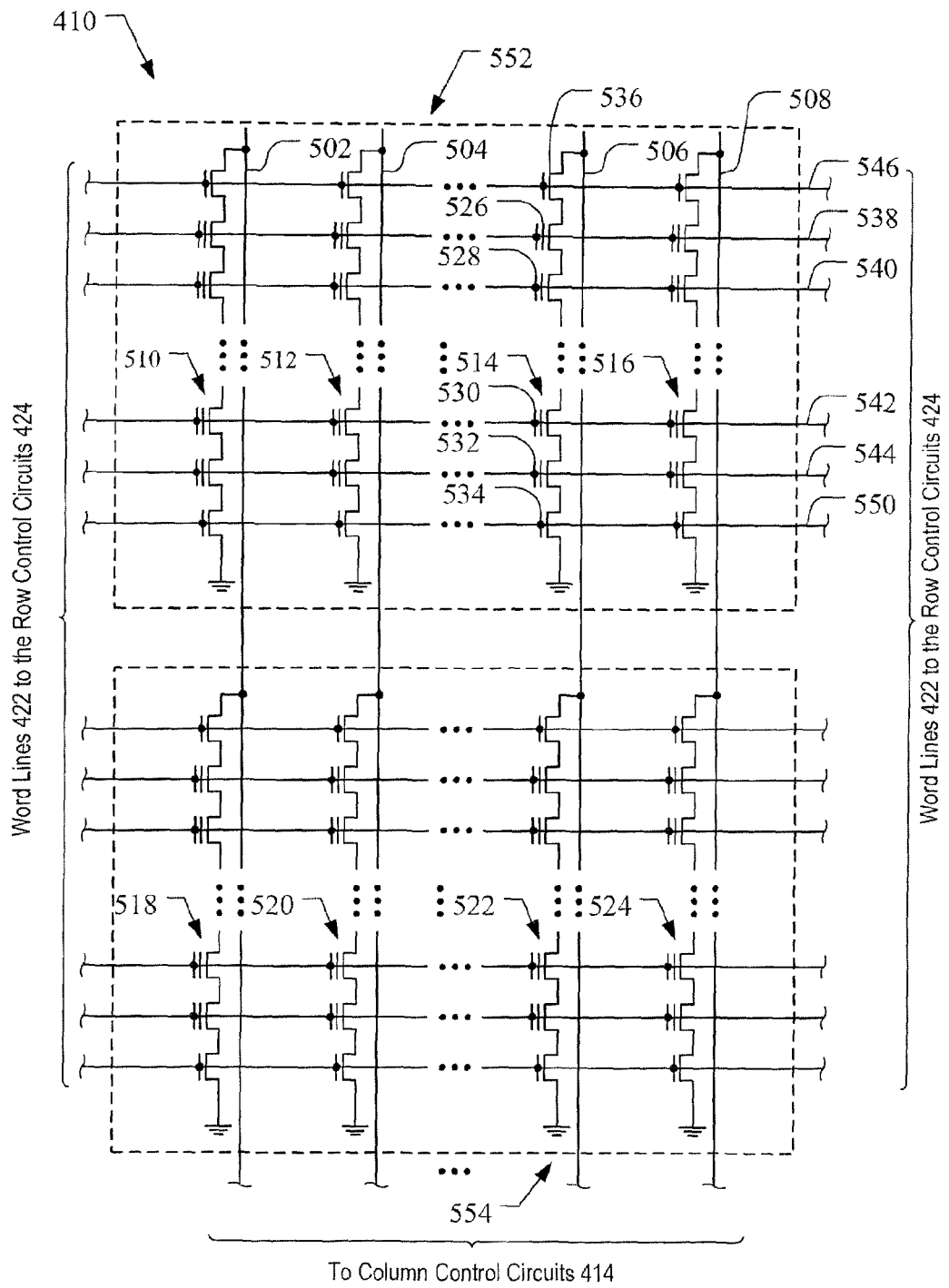
FIG. 5 is a representative circuit diagram of a memory cell array that may be used in the memory bank of FIG. 4.

Word lines 538-544 of FIG. 5 individually extend across the charge storage element of one memory cell in each of a number of strings of memory cells, and gates 546 and 550 control the states of the select transistors at each end of the strings. The memory cell strings that share common word and control gate lines 538-550 are made to form a block 552 of memory cells that are erased together. This block of cells contains the minimum number of cells that are physically erasable at one time. One row of memory cells, those along one of the word lines 538-544, are programmed at a time. Typically, the rows of a NAND array are programmed in a prescribed order, in this case beginning with the row along the word line 544 closest to the end of the strings connected to ground or another common potential. The row of memory cells along the word line 542 is programmed next, and so on, throughout the block 552. The row along the word line 538 is programmed last.

A second block 554 is similar, its strings of memory cells being connected to the same global bit lines as the strings in the first block 552 but having a different set of word and control gate lines. The word and control gate lines are driven to their proper operating voltages by the row control circuits 524. If there is more than one plane in the system, such as planes 1 and 2 of FIG. 4, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

Figure 6:
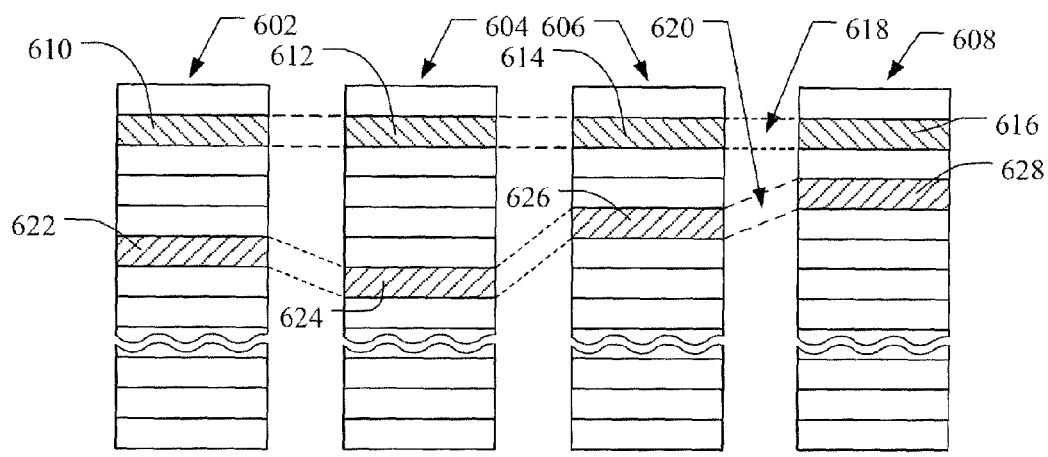
FIG. 6 illustrates an example physical memory organization of the memory bank of FIG. 4.

FIG. 6 conceptually illustrates an organization of one bank 220 of the multi-bank flash memory 116 (FIG. 2) that is used as an example in further descriptions below. Four planes 602-608 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 6 by rectangles, such as blocks 610, 612, 614 and 616, located in respective planes 602-608. There can be hundreds or thousands of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 610-616 are shown to form one metablock 618. All of the cells within a metablock are typically erased together. The blocks used to form a metablock need not be restricted to the same relative locations within their respective planes, as is shown in a second metablock 620 made up of blocks 622-628. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 7:
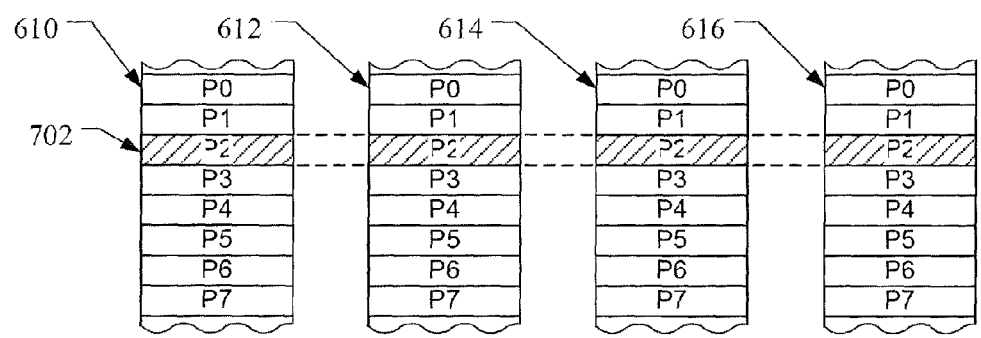
FIG. 7 shows an expanded view of a portion of the physical memory of FIG. 6.

The individual blocks are in turn divided for operational purposes into pages of memory cells, as illustrated in FIG. 7. The memory cells of each of the blocks 610-616, for example, are each divided into eight pages P0-P7. Alternatively, there may be 16, 32 or more pages of memory cells within each block. The page is the unit of data programming within a block, containing the minimum amount of data that are programmed or read at one time. In the NAND architecture of FIG. 4, a page is formed of memory cells along a word line within a block. However, in order to increase the memory system operational parallelism, such pages within two or more blocks may be logically linked into metapages. A metapage 702 is illustrated in FIG. 7, being formed of one physical page from each of the four blocks 610-616. The metapage 702, for example, includes the page P2 in each of the four blocks but the pages of a metapage need not necessarily have the same relative position within each of the blocks. Within a bank, a metapage is the maximum unit of programming.

As noted above, FIGS. 6-7 illustrate one embodiment of the memory cell arrangement that may exist in one memory bank 220 of the multi-bank memory 116. In one embodiment, regardless of individual memory cell configuration for each bank 220, the memory is broken up into a plurality of physical subarrays that are each mapped to a unique set of host LBA addresses referred to herein as LBA regions.

As discussed above, the host operating system 108, in combination with device drivers 112, send commands to the memory system 202. In the event that the memory system 202 includes additional or enhanced functionality that the host operating system 108 is unable to access, the host operating system 108 is unable to send a command to access the enhanced functionality. Rather than upgrading or modifying the host operating system 108 in order to access the additional or enhanced functionality on the memory system 202, a different part of the host system 200 is modified in order to notify the memory system 202 to apply the enhanced functionality. For example, the applications portion, such as one or both of the host applications 204 or an API (including enhanced API 206) is modified in order for the host system 200 to access the enhanced functionality on the memory system 202.

The applications portion may still use existing functionality of the host operating system 108, such as one or more commands that the host operating system 108 may send. For example, the applications portion can call the host operating system 108 to generate a write command to the memory system to write data to the memory 116. One example of a write command is an SD write command, with the SD write command indicative of a command to the memory system 202 to write data to the memory 116. The example of an SD write command is merely for illustration purposes only. Other commands are contemplated.

Using the existing commands of the host operating system 108, the applications portion may send a hijack command, and one or more subsequent commands for hijacking. In practice, the memory system 202 receives the hijack command, and after review of the hijack command, identifies the command as a hijack command. The memory system 202 may then store an identifier (such as a data sequence or an address) that is in the hijack command. When the memory system 202 receives subsequent commands, the memory system 202 may analyze, using the stored identifier, at least one aspect of the subsequent commands (such as a part of the data in the payload of the subsequent command or an address included in the subsequent command), and determine whether to hijack the subsequent command based on the analysis.

In one aspect, the applications portion includes one or more predetermined data sequences (such as one or more signatures) when accessing the existing functionality of the host operating system 108. For example, as part of a call to the host operating system 108 to generate an SD write command, the applications portion sends the one or more predetermined data sequences as data to write to the memory 116. The host operating system 108 includes the one or more predetermined data sequences as the payload of an SD write command and sends the SD write command to the memory system 202.

From the perspective of the memory system 202, the memory system 202 determines whether to hijack a received command using the identifier that was received in a previous command. The identifier may be a data sequence (such as a signature), and the memory system 202 may analyze the received command to determine whether the received command includes the data sequence. If the received command includes the data sequence (or a variation of the data sequence), the received command is hijacked. Alternatively, the identifier may be an address (such as an address in a hijack command), and the memory system 202 may compare the address in the received command with the address in the hijack command to determine whether to hijack the received command.

In the first aspect, the memory system 202 receives a hijack command, and stores the hijack identifier (such as the predetermined data sequence). The memory system 202 searches for the one or more predetermined data sequences in subsequently received commands, and if found, interprets the SD write command for hijacking, as discussed in more detail below. The command, from the perspective of the host operating system 108, instructs the memory system 202 to perform a particular action. Because of the one or more predetermined sequences, the memory system 202 "hijacks" the command by performing a different action prior to performing the action instructed by the host operating system 108 or by performing the different action instead of performing the action instructed by the host operating system 108. For example, the hijacked command may be part of an SD write command. The memory system 202 may review the SD write command, determine that the SD write command includes the one or more predetermined sequences (such as by reviewing the payload of the SD write command), and perform an action (such as encryption) prior to writing the data to memory 116 using the command arguments (such as the LBA) in the SD write command.

Examples of enhanced functionality on the memory system may include, but are not limited to, data encryption, data decryption, data streaming, data scrambling, data descrambling, and/or data watermarking.

In a first embodiment, the memory system 202 processes the commands to access the enhanced, functionality without relying on the LBAs in the commands. The LBAs, however, may be used by the memory system 202 for other actions related to the command, such as writing data in memory 116 in response to receiving a write command. In one embodiment, the initial command (such as the hijack command) may include one or more predetermined data sequences (such as one or more signatures) and data to be manipulated with the enhanced functionality. As discussed in more detail below, the host may separate the data subject to manipulation, and send part of the data with the hijack command, and send a remainder of the data in the subsequent commands. The size of data sent with the hijack command may depend on the size of the hijack data (including the signature, the NHS, etc., discussed below with respect to FIG. 12) sent with the subsequent commands.

In an alternate embodiment, the commands may include one or more predetermined data sequences. The hijack command does not include any of the data to be manipulated, with all of the data to be manipulated being sent in the subsequent commands. In still an alternate embodiment, an identifier indicative of an operation (such as a StreamID) may be sent in the hijack command. The StreamID thus may indicate an operation that is different from the operation as indicated in the command, as discussed below. The system controller 218 in the memory system 202 searches for the one or more predetermined data sequences, and if found, the system controller 218 manipulates the data with the enhanced functionality.

In a second embodiment, the memory system 202 uses an address in the commands as the hijack identifier. For example, the memory system 202 processes the commands to access the enhanced functionality by relying on the LBAs in the commands. The applications portion sends to the host operating system 108 one or more predetermined data sequences (such as one or more signatures) and an identification of part of the memory 116 (such as a file name). The host operating system 108 determines the LBA that correspond to the identification of the part of the memory (such as the LBA or an LBA range associated with the memory storing the identified file), and sends the one or more predetermined data sequences and the LBA to the memory system 202. The system controller 218 in the memory system 202 searches for the one or more predetermined data sequences, and if found, the system controller 218 stores the LBA that was sent from the host operating system 108. The system controller 218 then searches subsequent communications from the host system 200 for the LBAs. For example, the system controller 218 may compare the LBAs in the subsequent communications with the stored LBA, and based on the comparison, manipulate the data sent in the subsequent communication with the enhanced functionality. In particular, if the LBA in the subsequent communication are within the range of the stored LBA or identical to the stored LBA, the system controller 218 manipulates the data sent in the subsequent communication with the enhanced functionality.

Figure 8:
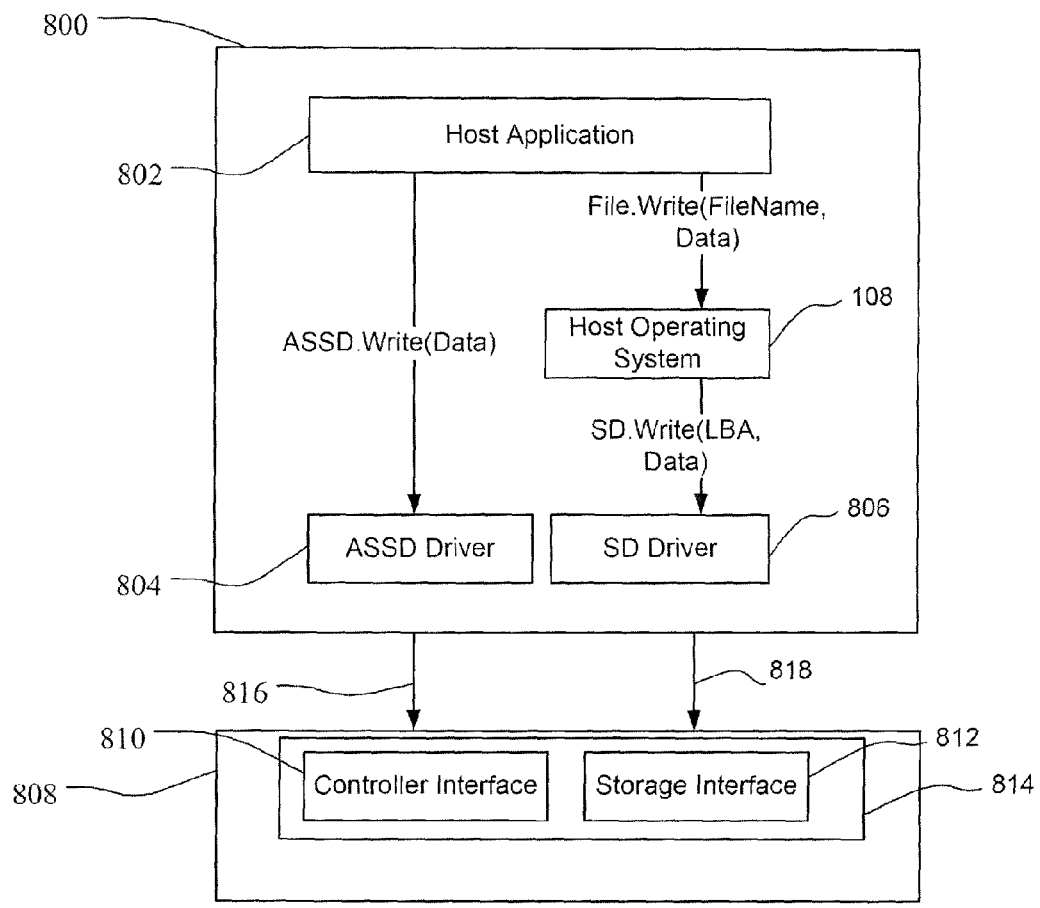
FIG. 8 is an example block diagram of the ways in which the host system sends a hijack command to the memory system.
Figure 12:
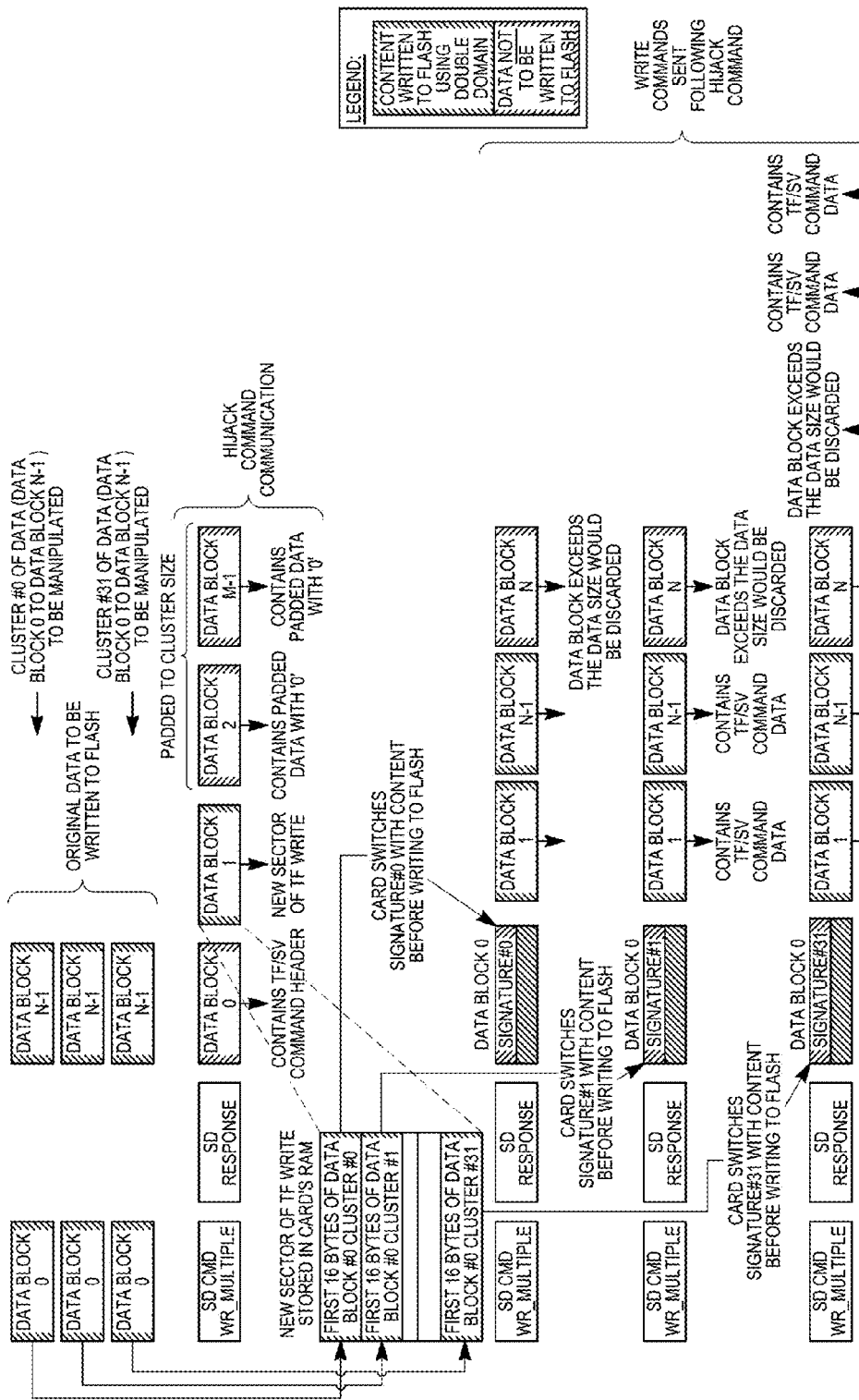
FIG. 12 is a block diagram illustrating the communications, including a hijack command, between the host system and the memory system.

The hijack command may be sent from the host system 800 to the memory system 808 in one of several ways, as depicted in the block diagram of FIG. 8. In particular, FIG. 8 illustrates two different ways in which the hijack command may be sent from the host system 800 to the memory system 808. One way is to send the hijack command via the command channel. One example of a command channel comprises the Advanced Security SD (ASSD) channel whereby the host application 802 sends a command to the memory system 808, such as an ASSD write command with data (shown as ASSD Write (data) in FIG. 8). Commands sent via the ASSD channel are not sent via the host file system 108, as shown in FIG. 8. The data in the ASSD write command may include a command opeode or other machine language instruction that specifies the operation of hijacking a subsequently sent command. The data may also include data for manipulation, such as the first 16 bytes of the first Data Block of each cluster subject to manipulation, as shown in FIG. 12. The ASSD command is sent via the ASSD Driver 804 to the system controller 218 of the memory system 808. An interface 814 may receive the ASSD command, review the ASSD command, and determine that the ASSD command should be routed to the controller interface 810. The controller interface 810 may include one or more APIs for communicating with the controller on the memory system. In particular, the controller interface 810 may process the ASSD command in order to identify the ASSD command as a hijack command and notify the controller accordingly (including sending the LBA to the controller for subsequent monitoring).

A second way to send the hijack command is via a host-file-system channel using the host operating system 108. One example of this is using the File Based Command Channel (FBCC). The host application 802 may send a file write request that includes the "FileName" and data. The data includes the hijack command (such as the one or more predetermined sequences) and data for manipulation. An example of the data is illustrated in FIGS. 12-14. The host operating system 108 receives the file write request and determines the LBA based on the "FileName". The host operating system 108 then generates an SD Write command with the LBA as one of the command arguments, and the data as the payload. The SD Write command is then sent to the memory system 808 via the SD Driver 806. The interface 814 may receive the SD write command, review the SD write command, and determine that the SD write command should be routed to the storage interface 812. The storage interface 812 may include one or more application program interfaces (APIs) for performing storage actions with a memory on the storage device. In particular, the storage interface 812 may process the SD write command in order to identify the SD write command as a hijack command and notify the controller accordingly (including sending the LBA to the controller for subsequent monitoring). As shown in FIG. 8, the two ways to send the hijack command (via the command channel and the File Based Command Channel) are depicted by two arrows 816, 818. The hijack command may be sent for the two ways via the same wires (such as the same 4-wire connection between the host 800 and the memory system 808). The hijack command, however, is processed by different APIs (via the controller interface 810 and the storage interface 812) depending on the type of command.

Figure 9:
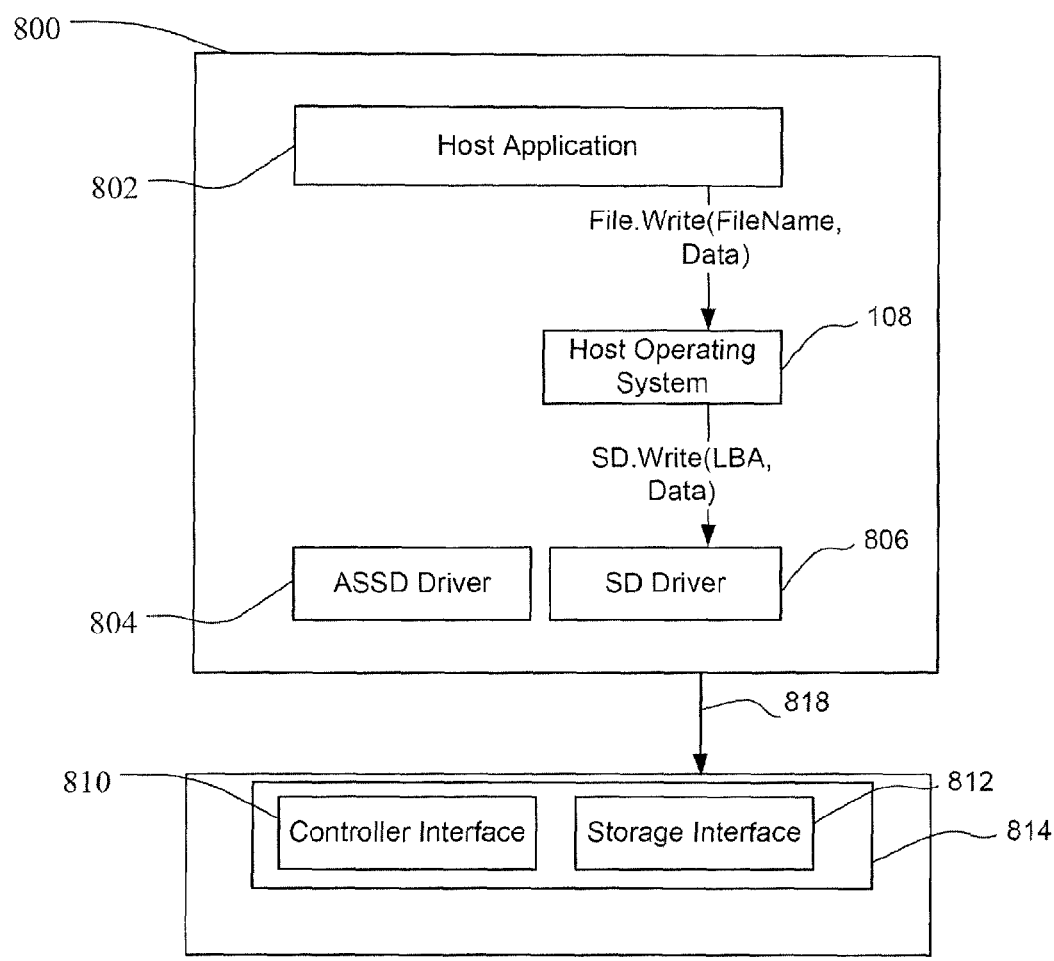
FIG. 9 is an example block diagram of the ways in which the host system sends commands to the memory system.

Subsequent write commands may be sent from the host system 800 to the memory system 808 via the host-file-system channel as depicted in the block diagram of FIG. 9. The host application 802 sends a file write request that includes the "FileName" and data. The "FileName" is the same file name that was described with respect to FIG. 8. The data includes the one or more predetermined data sequences and the data for manipulation. An example of the data is illustrated in FIG. 12. The host operating system 108 receives the file write request and determines the LBA based on the "FileName". The Host Operating System 108 then generates an SD Write command with the LBA as one of the command arguments, and the data as the payload. The SD Write command is then sent to the memory system 808 via the SD Driver 806. The interface 814 may receive the SD write command, review the SD write command, and determine that the SD write command should be routed to the storage interface 812.

As discussed in more detail below, after the memory system 808 receives the hijack command (either through the command channel or through the host-file-system channel), the memory system 808 begins to monitor the one or more predetermined values (such as a "Base Signature Value" at the beginning of every sector received from the host system, as shown in FIG. 12). In the event that the memory system 808 identifies the one or more predetermined values, the memory system "hijacks" the command by manipulating the data in the command with one or more functions.

Figure 10:
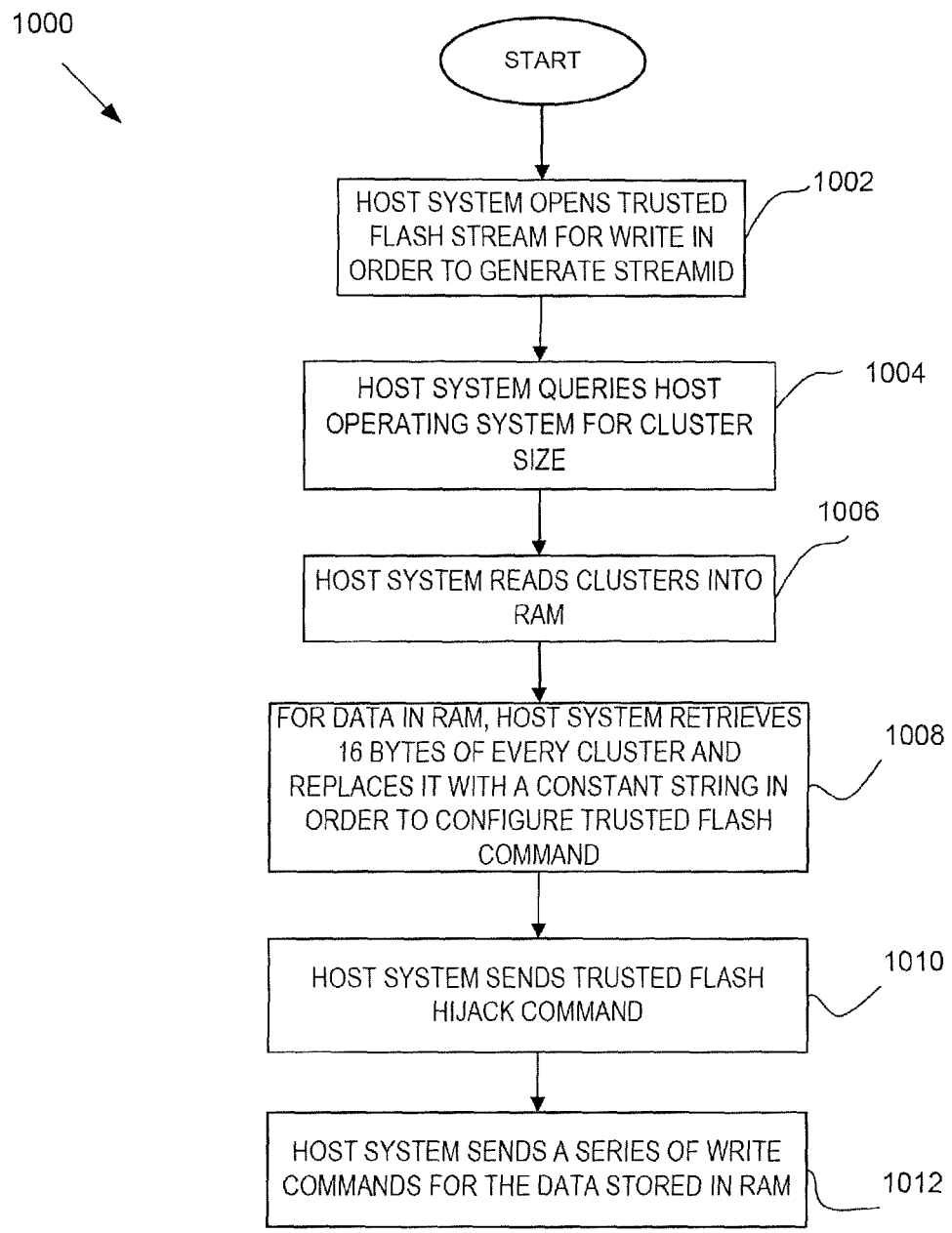
FIG. 10 is a flow diagram illustrating one embodiment of the host system generating commands, including a hijack command, to access enhanced functionality in the memory system without relying on the LBAs in the commands.

FIG. 10 is a flow diagram 1000 illustrating the first embodiment from the perspective of the host system. In one embodiment, the host system generates a series of commands, including a hijack command and one or more subsequent commands, to access enhanced functionality in the memory system without relying on the LBAs in the commands. At 1002, the host system opens a Trusted Flash stream for write in order to generate StreamID. As discussed in more detail below, the hijack command may include an indication of the operation to be performed by the memory system 202. One example of an indication of the operation to be performed is the StreamID. The host system may open the stream in order to define to the memory system a mathematical function. In response, the memory system may send to the host system the StreamID, which may be an identification of the "stream" that has been opened between the host system 200 and the memory system 202. The stream defines the function to be performed, such as encryption, and includes the definitions necessary to perform the function, such as defining the cryptographic keys for encryption and decryption. So that, the StreamID may act as a shorthand to define the function to the memory card. For example, the StreamID may be an argument in a command sent to the memory system 202 (such as in the payload of an SD write command), and indicate to the memory system 202 that the host system 200 requests the memory system 202 to manipulate with particular functions (such as encryption with predefined keys).

At 1004, the applications portion (such as the host application 204 and/or the enhanced API 206) queries the host operating system for cluster size. At 1006, the applications portion may read the clusters into a portion of memory on the host system 200 (such as RAM).

The applications portion may then reorganize the data stored in RAM prior to transport to the memory system. In particular, at 1008, for data in RAM, the applications portion may retrieve a part (such as 16 bytes) from one, some, or every cluster, and may replace the retrieved part with one or more predetermined data sequences (such as one or more signatures). The amount retrieved from every cluster may be equal to the size of the signature (or other predetermined data sequence). The retrieved part from the clusters may be included in a hijack command, which may also include arguments, such as the one or more predetermined data sequences and an indication of the operation requested (such as the StreamID).

At 1010, the host system sends the hijack command to the memory system. As discussed with respect to FIG. 8, the hijack command may be sent via the command channel (such as using an ASSD command) or via the host-file-system channel (such as using a Trusted Flash command). When the hijack command is sent via the command channel, an ASSD command is generated that includes a command opcode that specifies the operation of hijacking a subsequently sent command, and optionally data for manipulation, such as the first 16 bytes of the first Data Block of each cluster subject to manipulation, as discussed above. When the hijack command is sent via the host-file-system channel, the applications portion sends a request to the host operating system 108 for the host operating system 108 to generate a command (such as a write command) to send to the memory system. Along with the request, the applications portion optionally sends data that includes one or more arguments that define the hijack command, such as shown in FIGS. 13 and 14. In response to the request, the host operating system 108 generates a write command that includes a payload with the arguments shown in FIGS. 13 and 14.

At 1012, the host system sends a series of subsequent commands for the data stored in RAM, as shown in more detail with respect to FIG. 12. In particular, the applications portion sends a request to the host operating system 108 for the host operating system 108 to generate a command (such as a write command) to send to the memory system. Along with the request, the applications portion sends an indication of a file, and data (which includes the signature and data for manipulation). In response to the request, the host operating system 108 generates a write command that includes one or more LBAs (based on the indication of the file) and a payload (which may include the data comprising the signature, cluster#, amount of data to be manipulated, and the data for manipulation). Thus, the data subject to manipulation may be sent in both the hijack command and in the series of subsequent commands. Alternatively, in the instance where all of the data to be manipulated can be sent in the hijack command, no subsequent commands need be sent.

Figure 11:
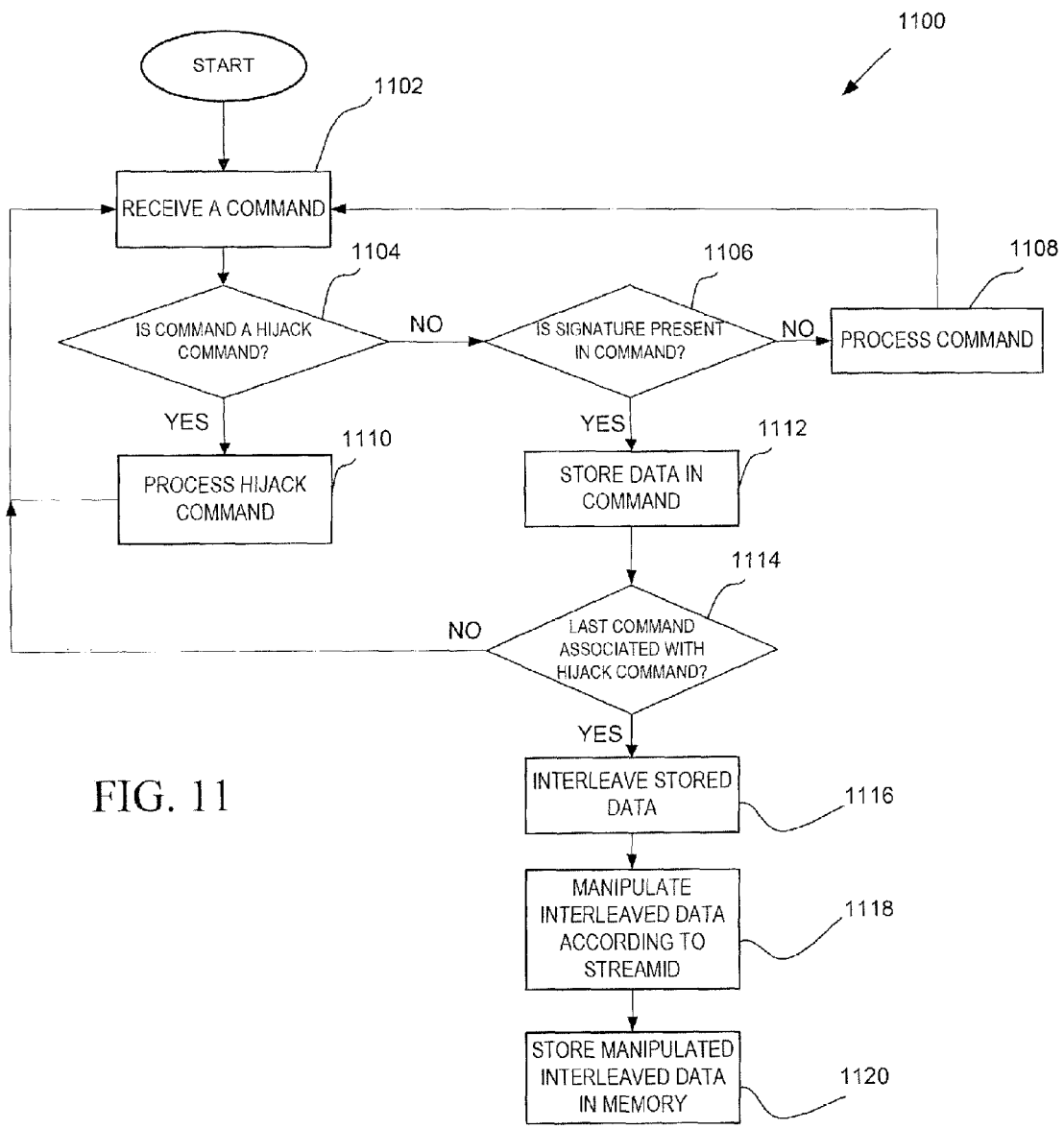
FIG. 11 is a flow diagram illustrating one embodiment of the memory system processing commands, including a hijack command, to access enhanced functionality in the memory system without relying on the LBAs in the commands.

FIG. 11 is a flow diagram 1100 illustrating the first embodiment from the perspective of the memory system. In particular, FIG. 11 illustrates the memory system processing commands, including a hijack command, to access enhanced functionality in the memory system without relying on the LBAs in the commands. At 1102, the memory system receives a command. At 1104, the memory system determines whether the received command is a hijack command. As discussed above, a hijack command may include one or more predetermined sequences and an operation identification (such as a StreamID). If the command is a hijack command, at 1110, the memory system processes the hijack command. In the instance where the hijack command is embedded in second command, the memory system may process the hijack command by storing part or all of the data in the hijack command and storing the StreamID (such as storing part or all of the data in the hijack command in volatile memory). Further, the memory system may ignore the second command. As discussed above, the hijack command may be embedded in an SD write command. The memory system may analyze the SD write command to determine whether it is a hijack command (such as performed at 1104). If the SD write command is identified as a hijack command, the memory system may ignore the command to write the contents of the payload to the memory 116. As illustrated in FIG. 12, the hijack command may be the first in a series of commands sent from the host, with the data in each of the hijack command and the subsequent commands being manipulated. After the hijack command is processed, the flow chart 1100 returns to block 1102 to wait to receive a subsequent command.

If the command is not a hijack command, at 1106, the memory system determines whether a signature is present in the command. In the event that the data that is to be manipulated is greater than can be sent in the hijack command, subsequent commands that include the data are sent to the memory system. The subsequent commands include the signature to identify that the command is related to the hijack command. The subsequent commands may further include additional data to indicate the arrangement of the data. As discussed in FIG. 12, the data to be manipulated may be a series of clusters, with the data being sent in a series of write commands. The additional data included in the subsequent commands indicates the arrangement of the data in the series of clusters.

If the signature is present in the command, the data in the command is stored at 1112 (such as stored in volatile memory, e.g., RAM). The memory system checks whether the command is the last one associated with the hijack command, at 1114. If so, the data is interleaved or rearranged at block 1116. One example of interleaving is to join data received with the hijack command with data sent in subsequent commands, as discussed in more detail in FIG. 12. After interleaving of the data, the amount of data may be the same, greater, or less than the amount of data prior to interleaving. For example, part of the data in the hijack command may exactly replace a part of the data sent in the subsequent command so that the amount of data after interleaving is the same as the amount of data prior to interleaving. As another example, part of the data in the hijack command may be appended to a part of the data sent in the subsequent command so that the amount of data after interleaving is greater than the amount of data prior to interleaving. As still another example, part of the data in the hijack command may replace more of the data sent in the subsequent command so that the amount of data after interleaving is less than the amount of data prior to interleaving.

At 1118, the interleaved data is manipulated according to the StreamID. As discussed above, the StreamID is indicative of the operation to be performed on the data (such as encryption). At 1120, the manipulated interleaved data is stored in memory 116. For example, if the one or more commands sent after the hijack command are SD write commands, the memory system 202 can store the manipulated interleaved data according to one or more command arguments in the SD write commands. If the signature is not present in the command, at 1108, the command is processed normally.

As discussed in more detail below with respect to FIG. 12, the applications portion separates the data (such as removing 16 bytes of every cluster) so that part of the data is sent in the initial command (e.g., the hijack command) and a remainder of the data is sent in the one or more subsequent commands. The memory card may store the data from the hijack command and the one or more subsequent commands in non-volatile memory (such as RAM), and reorganize the data stored in RAM (such as put the data into the same order as the data was organized in the host system prior to the applications portion separating the data). As discussed above, in one aspect, after the memory card reorganizes the data, the size of the reorganized data matches the size of the LBAs in the one or more subsequent commands. Thus, in addition to performing the manipulation of the data according to the StreamID, the memory card may execute the commands in the one or more subsequent commands using the one or more LBAs in the one or more subsequent commands.

For example, the one or more subsequent commands may include multiple SD write commands. After reorganization of the data, the amount of reorganized data (with the signature removed and replaced with data sent with the hijack command) equals the amount of data as indicated in the LBAs in the SD write commands. So that, after the memory card manipulates the data according to the StreamID, the memory card may store the manipulated data in the memory 116 according to the LBAs in the SD write commands.

FIG. 12 is a block diagram illustrating the communications, including a hijack command, between the host system and the memory system. The upper portion of FIG. 12 depicts the data to be sent to the memory system 202 for manipulation and storage. As shown, there are multiple clusters of data, such as Cluster #0 of data (Data Block 0 to Data Block N−1) and Cluster #31 of data (Data Block 0 to Data Block N−1). Though 32 clusters of data are depicted in FIG. 12, more or fewer clusters of data may be sent to the memory system 202 for manipulation.

As shown in FIG. 12, the hijack command and the commands sent subsequent to the hijack command are SD write commands. Alternatively, the hijack command may be a different type of command than the commands sent subsequent to the hijack command (such as a command other than an SD write command).

The host operating system is called to generate an SD write command, which includes command arguments and data sent from the applications portion. In particular, the applications portion generates Data Block 0 to Data Block M−1. One data block (shown as Data Block 0) includes the Trusted Flash command header. An example of this is depicted in the table shown in FIG. 13. Another data block (shown as Data Block 1) includes data to be manipulated. As discussed above, part of the data to be manipulated is sent in the hijack command. As shown in FIGS. 12 and 14, the first 16 bytes of data from Data Block 0 of each cluster is arranged in a single data block. The 16 bytes of data extracted from each cluster and sent via the hijack command is merely for illustration purposes. Fewer or greater amount of data may be extracted and sent in the hijack command. For example, if the signature is larger than 16 bytes (such as 32 bytes), then 32 bytes may be extracted from each cluster and sent via the hijack command. Other data blocks (shown as Data Block 2 through Data Block M−1) are padded with '0' so that the payload of the command is the cluster size.

The hijack command may be sent as one communication from the host system 200 to the memory system 202. Alternatively, the hijack command may include a series of communications. For example, the host operating system 108 may first send the SD CMD WR_MULTIPLE command to the memory system 202 that includes the command arguments for the SD write command. In response to receiving the SD CMD WR_MULTIPLE command, the memory system 202 sends an SD response. The host system 200 then sends a series of data blocks (shown as Data Block 0 to Data Block M−1).

After sending the hijack command, the host system may send a series of additional commands (such as SD write commands) in order to send the remaining portion of the data to be manipulated. Similar to the sending of the hijack command, the applications portion may include a signature in the data to indicate that the command is related to the hijack command. Moreover, the applications portion may include an indication of the sequence of the data.

The Number of Hijacked Sectors, NHS in FIG. 13, may be appended to the "Base Signature Value". The memory card, in receiving the commands hijacks all NHS sectors written to the consecutive LBA of the first sector (written through any combination of single or multiple SD commands), starting from the first sector containing the signature. For example, the commands may include a "Signature#N", which includes the signature and an indication of which cluster the data is associated with (such as an index extension), as shown in FIG. 12. For example, Data Block 0 may include "Signature#0", which includes both the signature and #0 indicating that the data is related to Cluster

0. As shown in FIG. 12, "Signature#N" is at the beginning of the payload. Alternatively, "Signature#N" may be in a different section of the payload. Moreover, the payload may be padded with '0' (as shown at Data Block N in FIG. 12). Thus, the series of additional commands may include a common base signature, additional sequence information, and the NHS.

Upon receiving the hijack command and the subsequent write commands, the memory system 202 rearranges the data by interleaving the data sent in the hijack command with data sent in the subsequent write commands. The sequence indicator may be used for interleaving of the data. For example, in a write of 32 clusters (clusters#0 to cluster#31), the sequence indicator (such as #2) may indicate that the data associated with the command is for cluster#2. The memory card may substitute the signature with the appropriate original data sent along with the hijack command (such as the first 16 bytes of data block #0 from cluster#2) before writing the hijacked data through the stream. Thus, because the size of the "Signature#N" is extracted from each cluster and sent with the hijack command, the memory system may replace "Signature#N" with the data sent in the hijack command. The legend in FIG. 12 depicts which data is written to the flash memory and which is not written to the flash memory. Once the stream is closed, the memory system may discard the command and any remaining signatures, and the data may be written to memory 116 as regular data. Further, the NHS in the subsequent write commands may be used to determine an amount of the data in the payload of the command to use for interleaving. For example, the NHS may indicate a number of sectors for hijack. Using the NHS, the memory system may take the number of sectors from the payload (as indicated by the NHS) for the hijack operation.

FIG. 13 is a table listing the write command arguments in the hijack command. FIG. 14 is a table listing the organization of the data blocks in the hijack command.

In a second embodiment, the memory system 202 processes the hijack command in a series of two or more commands using the LBAs. In a first command, the host system 200 sends to the memory system the Hijack command that includes the one or more predetermined data sequences and the LBA as provided by the host file operating system 108. In a subsequent command, the host system 200 sends the data and the LBA. In response, the memory system 202 compares the LBA in the first command with the LBA in the subsequent command to determine whether to perform the operation on the data. For example, the memory system 202 compares the LBAs to determine whether the LBAs in the first and subsequent command are the same, or to determine whether the LBA in the subsequent command is in the range of the LBA as indicated in the first command.

Figure 15:
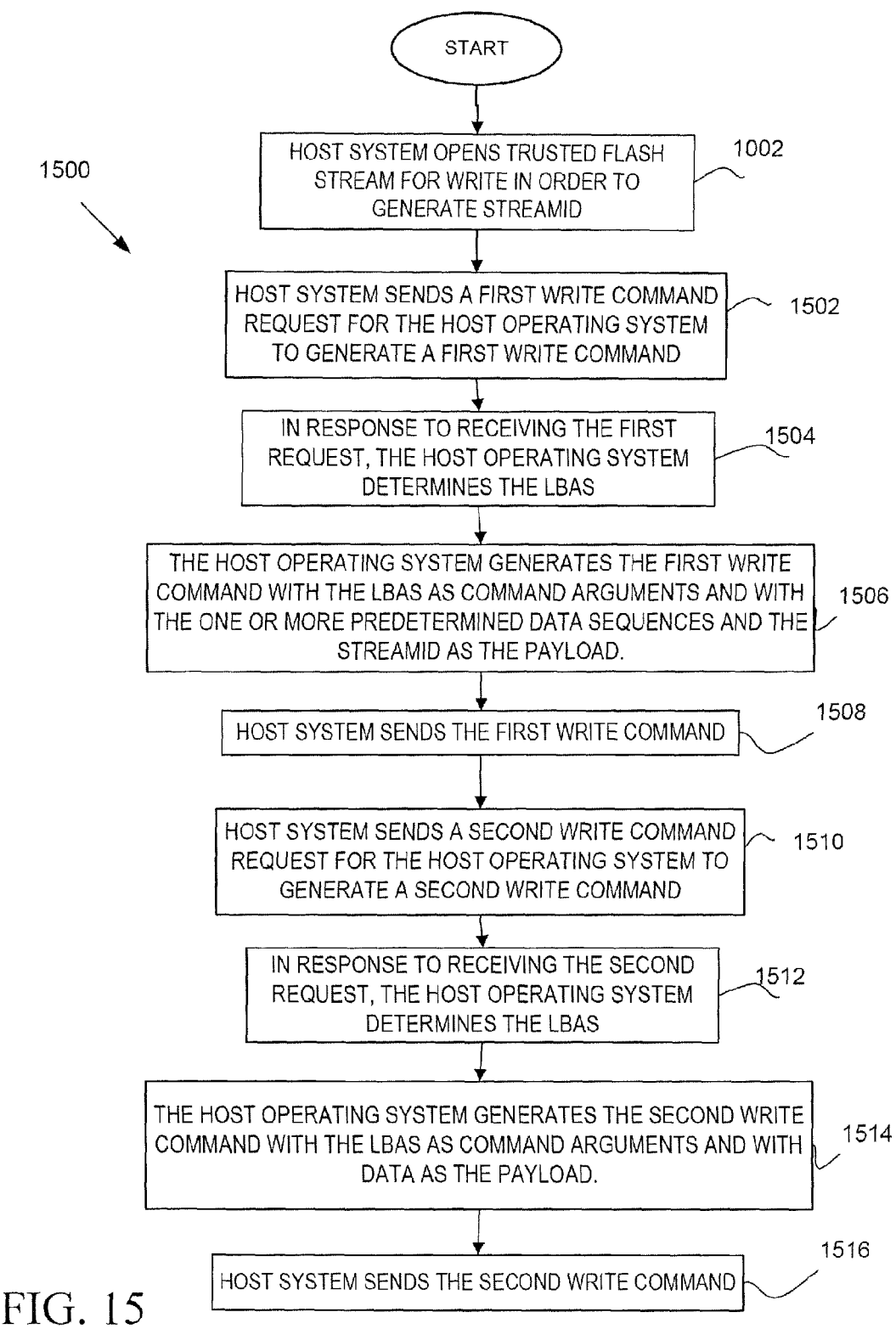
FIG. 15 is a flow diagram illustrating one embodiment of the host system generating commands, including a hijack command, to access enhanced functionality in the memory system by relying on the LBAs in the commands.

FIG. 15 is a flow diagram 1500 illustrating the second embodiment from the perspective of the host system. Similar to FIG. 10, the host system opens a Trusted Flash stream for write in order to generate StreamID at 1002. The host system, such as the applications portion, sends a first request to the host operating system to generate a write command at 1502. The first request to generate the first write command includes data (such as the one or more predetermined data sequences and the StreamID) and an identification of a portion of the memory (such as a file). In response to receiving the first request, at 1504, the host operating system determines the LBA for the portion of the memory (such as the LBA for the file). At 1506, the host operating system then generates the first write command (such as an SD write command) with the LBA as command arguments and with the data (including the one or more predetermined data sequences and the StreamID) as the payload. At 1508, the host system sends the first write command. At 1510, the host system sends a second request to the host operating system to generate a write command. The second request to generate the second write command includes data to be manipulated (such as encrypted) and the same identification of the portion of the memory as sent in the first request. In response to receiving the second request, at 1512, the host operating system determines the LBA for the portion of the memory. At 1514, the host operating system then generates the second write command with the LBAs as command arguments and with the data for manipulation as the payload. At 1516, the host system sends the second write command. The use of a write commands in FIG. 15 is merely for illustration purposes. Different commands of the host operating system that include LBAs as command arguments may likewise be used.

Figure 16:
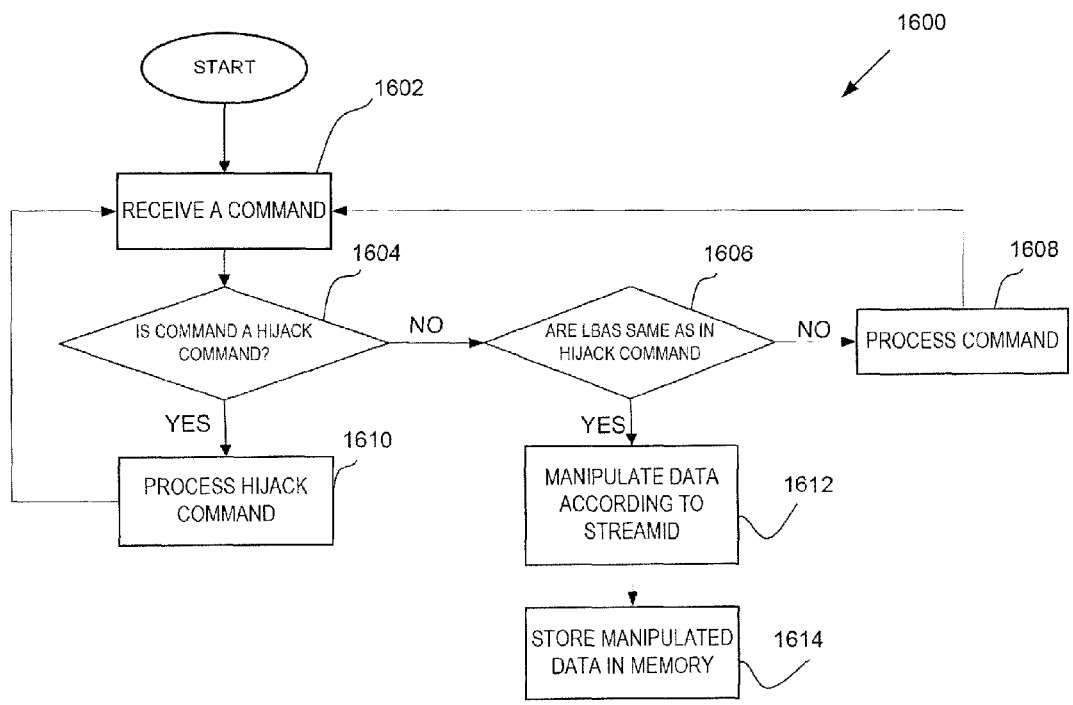
FIG. 16 is a flow diagram illustrating one embodiment of the memory system processing commands, including a hijack command, to access enhanced functionality in the memory system by relying on the LBAs in the commands.

FIG. 16 is a flow diagram 1600 illustrating the second embodiment from the perspective of the memory system. In particular, FIG. 16 illustrates the memory system processing commands, including a hijack command, to access enhanced functionality in the memory system relying on the LBAs in the commands. At 1602, the memory system receives a command. At 1604, the memory system then determines whether the received command is a hijack command. As discussed above, the memory system may determine whether a received command is a hijack command if the command includes one or more predetermined sequences (such as a signature). If the command is a hijack command, at 1610, the memory system processes the hijack command. One example of processing the hijack command is storing part or all of the LBA in the hijack command and storing the StreamID associated with the hijack command. After the hijack command is processed, the flow chart 1600 returns to block 1602 to wait to receive a subsequent command.

If the command is not a hijack command, at 1606, the memory system examines the LBA in the command (such as determining whether the LBAs in the hijack command and the subsequent command are the same). As discussed above in FIG. 15, a second write command is sent after the hijack command that includes the data to be manipulated and the same LBA as defined in the hijack command. If the LBA is the same as those defined in the hijack command or if the LBA is in the range of those defined in the hijack command, at 1612, the data in the payload of the command is manipulated according to the StreamID in the hijack command. As discussed above, the StreamID is indicative of the operation to be performed on the data (such as encryption). At 1614, the manipulated data is stored in memory 116. If the LBA is not the same as those defined in the hijack command, at 1608, the command is processed normally.

In one embodiment, a method for a host device to manage a storage device is provided. The method comprises, in a host operatively coupled to a storage device, the host: identifying data for a manipulation operation to be performed by the storage device; configuring a command, the command indicative of an operation to be performed by the storage device and including an identifier; sending the command to the storage device; configuring one or more subsequent commands, the one or more subsequent commands indicative of another operation that is different from the operation, the one or more subsequent commands including at least a part of the data and a manipulation identifier, the manipulation identifier being based on the identifier; and sending the one or more subsequent commands to the storage device.

The method includes: wherein the one or more subsequent commands includes the at least a part of the data; and wherein the command includes a remainder of the data. The method further includes: wherein the data for manipulation are in different portions; further comprises copying a part of each of the portions, the part of each of the portions equal to the manipulation identifier; and wherein the copied part of each of the portions is included in the command. The method also includes: wherein the one or more subsequent commands includes a plurality of subsequent commands; further comprises, for each of the portions, replacing the copied part of each of the portions with the manipulation identifier to generate replaced portions of data; and wherein the replaced portions of data are included in the plurality of subsequent commands. In addition, the method includes wherein each of the plurality of subsequent commands include a logical block address (LBA) indicating a range of the LBA, the range of the LBA for a respective subsequent command equal to an amount of the replaced portion of data.

The method also includes: wherein the one or more subsequent commands includes a plurality of subsequent commands; wherein each of the plurality of subsequent commands includes a manipulation identifier; and wherein the manipulation identifier is different for each of the plurality of subsequent commands. The method further includes wherein the manipulation identifier for a respective subsequent command includes the identifier in the storage command and a sequence indicator indicating a sequence order for the data in the respective subsequent commands. The method also includes wherein the manipulation identifier in the respective subsequent command further includes an amount indicator indicating an amount of the data in the respective subsequent command. The method further includes: wherein the command comprises a controller command for a controller in the storage device; and wherein the one or more subsequent commands comprise one or more storage commands for a memory in the storage device. The method includes: wherein the command comprises a storage command for a memory in the storage device; and wherein the one or more subsequent commands comprise one or more subsequent storage commands for the memory in the storage device. The method further includes wherein the identifier comprises a signature. The method also includes wherein sending the command to the storage device is performed prior to configuring the one or more subsequent commands. The method further includes: wherein the operation includes decryption, encryption or a combination thereof; and wherein the another operation includes reading or writing to the storage device.

In another embodiment, a host device is disclosed. The host device comprises: an interface for operatively coupling to a storage device; and a controller in communication with the interface. The controller is configured to: determine data for a manipulation operation to be performed by the storage device; configure a command, the command indicative of an operation to be performed by the storage device and including an identifier; send the command via the interface to the storage device; configure one or more subsequent commands, the one or more subsequent commands indicative of another operation that is different from the operation, the one or more subsequent commands including at least a part of the data and a manipulation identifier, the manipulation identifier being based on the identifier; and send the one or more subsequent commands via the interface to the storage device.

The host device includes: wherein the one or more subsequent commands includes the at least a part of the data; and wherein the command includes a remainder of the data. The host device also includes: wherein the data for manipulation are in different portions; wherein the controller is further configured to copy a part of each of the portions, the part of each of the portions equal to the manipulation identifier; and wherein the copied part of each of the portions is included in the command. The host device further includes: wherein the one or more subsequent commands includes a plurality of subsequent commands; wherein the controller is further configured to replace, for each of the portions, the copied part of each of the portions with the manipulation identifier to generate replaced portions of data; and wherein the replaced portions of data are included in the plurality of subsequent commands.

The host device may also include wherein each of the plurality of subsequent commands include a logical block address (LBA) indicating a range of the LBA, the range of the LBA for a respective subsequent command equal to an amount of the replaced portion of data. The host device further includes: wherein the one or more subsequent commands includes a plurality of subsequent commands; wherein each of the plurality of subsequent commands includes a manipulation identifier; and wherein the manipulation identifier is different for each of the plurality of subsequent commands. In addition, the host device includes wherein the manipulation identifier for a respective subsequent command includes the identifier in the storage command and a sequence indicator indicating a sequence order for the data in the respective subsequent commands. The host device also includes wherein the manipulation identifier in the respective subsequent command further includes an amount indicator indicating an amount of the data in the respective subsequent command.

The host device includes: wherein the command comprises a controller command for a controller in the storage device; and wherein the one or more subsequent commands comprise one or more storage commands for a memory in the storage device. The host device also includes: wherein the command comprises a storage command for a memory in the storage device; and wherein the one or more subsequent commands comprise one or more subsequent storage commands for the memory in the storage device. The host device further includes: wherein the operation includes decryption, encryption or a combination thereof; and wherein the another operation includes reading or writing to the storage device.

It is intended that the foregoing detailed description be understood as an illustration of selected forms that the invention can take and not as a definition of the invention. It is only the following claims, including all equivalents, that are intended to define the scope of this invention. Also, some of the following claims may state that a component is operative to perform a certain function or configured for a certain task. It should be noted that these are not restrictive limitations. It should also be noted that the acts recited in the claims can be performed in any order and not necessarily in the order in which they are recited.

We claim:

1. A method for managing a storage device, the method comprising:
   in the storage device operatively coupled to a host device, the storage device:
      receiving a hijack command, wherein the hijack command comprises a stream indicator, the hijack command indicative to the storage device to review one or more subsequently received commands for the stream indicator and responsive to determining that the one or more subsequently received commands includes the stream indicator, perform a hijack operation, wherein the hijack operation comprises a data manipulation operation;

receiving the one or more subsequently received commands, wherein the one or more subsequently received commands are indicative of a command operation and comprising data;

determining whether the one or more subsequently received commands include the stream indicator;

in response to determining that the one or more subsequently received commands include the stream indicator, performing the hijack operation on the data instead of or in addition to the command operation; and in response to determining that the one or more subsequently received commands do not include the stream indicator, performing the command operation on the data without performing the hijack operation on the data.

2. The method of claim 1, wherein the host device includes a host operating system and an API, the host operating system including a set of functions accessed by the one or more commands;

wherein the storage device includes an additional function not included in the set of functions; and wherein the API is configured to generate the one or more subsequently received commands using the stream indicator in order to access the additional function on the storage device.

3. The method of claim 1, wherein the hijack command further comprises an identifier indicative of the hijack operation; and wherein, in response to determining that the one or more subsequently received commands contain the stream indicator, the storage device performs the hijack operation on at least part of the data in addition to performing the command operation.

4. The method of claim 1, wherein the hijack command further comprises an identifier indicative of the hijack operation; and wherein, in response to determining that the one or more subsequently received commands contain the stream indicator, the storage device performs the hijack operation on at least part of the data instead of performing the command operation.

5. The method of claim 1, wherein the one or more subsequently received commands are received via a storage interface; and wherein the hijack command is received via an interface other than the storage interface.

6. The method of claim 5, wherein the storage interface includes a file system channel; and wherein the interface other than the storage interface includes a command channel.

7. The method of claim 5, wherein the hijack command comprises a write command;

wherein the stream indicator is in a payload of the write command;

wherein the subsequently received commands comprise write commands;

wherein the memory system analyzes the stream indicator in the payload to interpret the write command as the hijack command indicative of the hijack operation; and wherein the hijack operation includes decryption, encryption or a combination thereof.

8. The method of claim 1, wherein the one or more subsequently received commands includes at least a part of the data; and wherein the hijack command includes a remainder of the data.

9. The method of claim 1, wherein the hijack command comprises a controller command for a controller in the storage device; and wherein the one or more subsequently received commands comprise one or more storage commands for a memory in the storage device.

10. The method of claim 1, wherein the hijack operation includes decryption, encryption or a combination thereof; and wherein the command operation includes reading or writing to the storage device.

11. The method of claim 1, wherein the hijack command comprises a payload, the payload including the stream indicator.

12. The method of claim 1, wherein the stream indicator comprises an address range;

wherein the storage device is configured to review addresses in the one or more subsequently received commands in order to determine whether the addresses in the one or more subsequently received commands are within the address range; and responsive to determining that the addresses in the one or more subsequently received commands are within the address range, performing the hijack operation on the data instead of or in addition to the command operation.

13. A storage device comprising:

an interface for operatively coupling to a host device; and a controller in communication with the interface, the controller configured to:

receive a hijack command, wherein the hijack command comprises a stream indicator, the hijack command indicative to the storage device to review one or more subsequently received commands for the stream indicator and responsive to determining that the one or more subsequently received commands includes the stream indicator, perform a hijack operation, wherein the hijack operation comprises a data manipulation operation;

receive the one or more subsequently received commands, wherein the one or more subsequently received commands are indicative of a command operation and comprising data;

determine whether the one or more subsequently received commands include the stream indicator;

in response to determining that the one or more subsequently received commands include the stream indicator, perform the hijack operation on the data instead of or in addition to the command operation-in response to determining that the one or more subsequently received commands do not include the stream indicator, perform the command operation on the data without performing the hijack operation on the data.

14. The storage device of claim 13, wherein the host device includes a host operating system and an API, the host operating system including a set of functions accessed by the one or more commands;

wherein the storage device includes an additional function not included in the set of functions; and wherein the API is configured to generate the one or more subsequently received commands using the stream indicator in order to access the additional function on the storage device.

15. The storage device of claim 13, wherein the hijack command further comprises an identifier indicative of the hijack operation; and wherein, in response to determining that the one or more subsequently received commands contain the stream indicator, the controller is configured to perform the hijack operation on at least part of the data in addition to performing the command operation.

16. The storage device of claim 13, wherein the hijack command further comprises an identifier indicative of the hijack operation; and wherein, in response to determining that the one or more subsequently received commands contain the stream indicator, the controller is configured to perform the hijack operation on at least part of the data instead of performing the command operation.

17. The storage device of claim 13, wherein the controller is configured to receive the one or more subsequently received commands via the storage interface; and wherein the controller is configured to receive the hijack command via the interface other than the storage interface.

18. The storage device of claim 17, further comprising a file system channel; and wherein the interface other than the storage interface includes a command channel.

19. The storage device of claim 17, wherein the hijack command comprises a write command;

wherein the stream indicator is in a payload of the write command;

wherein the subsequently received commands comprise write commands;

wherein the controller is configured to analyze the stream indicator in the payload to interpret the write command as the hijack command indicative of the hijack operation; and wherein the hijack operation includes decryption, encryption or a combination thereof.

20. The storage device of claim 13, wherein the hijack operation includes decryption, encryption or a combination thereof; and wherein the command operation includes reading or writing to the storage device.

21. A method for managing a storage device, the method comprising:

in the storage device operatively coupled to a host device, the storage device:

receiving a command from the host device, the command indicative of a command operation and comprising a payload including data;

reviewing the payload to determine whether the payload includes a hijack indicator, the hijack indicator indicative to the storage device to perform a hijack operation;

in response to determining that the payload includes the hijack indicator, performing the hijack operation in addition to or instead of the command operation on the data; and in response to determining that the payload does not include the hijack indicator, performing the command operation on the data without performing the hijack operation on the data.

22. The method of claim 21, wherein in response to determining that the payload includes the hijack indicator, performing the hijack operation in addition to the command operation on the data.

23. The method of claim 21, wherein in response to determining that the payload includes the hijack indicator, performing the hijack operation instead of the command operation on the data.

24. The method of claim 21, wherein the command comprises a write command; and wherein the hijack operation includes decryption, encryption or a combination thereof.

25. A storage device comprising:

an interface for operatively coupling to a host device; and a controller in communication with the interface, the controller configured to:

receive a command from the host device, the command indicative of a command operation and comprising a payload including data;

review the payload to determine whether the payload includes a hijack indicator, the hijack indicator indicative to the storage device to perform a hijack operation;

in response to determining that the payload includes the hijack indicator, perform the hijack operation in addition to or instead of the command operation on the data; and in response to determining that the payload does not include the hijack indicator, perform the command operation on the data without performing the hijack operation on the data.

26. The storage device of claim 25, wherein in response to determining that the payload includes the hijack indicator, the controller is configured to perform performing the hijack operation in addition to the command operation on the data.

27. The storage device of claim 25, wherein in response to determining that the payload includes the hijack indicator, the controller is configured to perform the hijack operation instead of the command operation on the data.

28. The storage device of claim 25, wherein the command comprises a write command; and wherein the hijack operation includes decryption, encryption or a combination thereof.

* * * * *